Nov. 13, 1962 B. D. BROWN 3,064,200

BALANCED DEMODULATORS

Filed April 17, 1959 2 Sheets-Sheet 1

INVENTOR
BARRY DAVID BROWN
BY H Vincent Harsha
ATTORNEY

Nov. 13, 1962 B. D. BROWN 3,064,200

BALANCED DEMODULATORS

Filed April 17, 1959 2 Sheets-Sheet 2

INVENTOR
BARRY DAVID BROWN
BY H. Vincent Harsha
ATTORNEY

United States Patent Office 3,064,200

Patented Nov. 13, 1962

3,064,200

BALANCED DEMODULATORS

Barry David Brown, West Newton, Mass., assignor to Raytheon Company, a corporation of Delaware Filed Apr. 17, 1959, Ser. No. 807,235
5 Claims. (Cl. 329—163)

Figure 1:
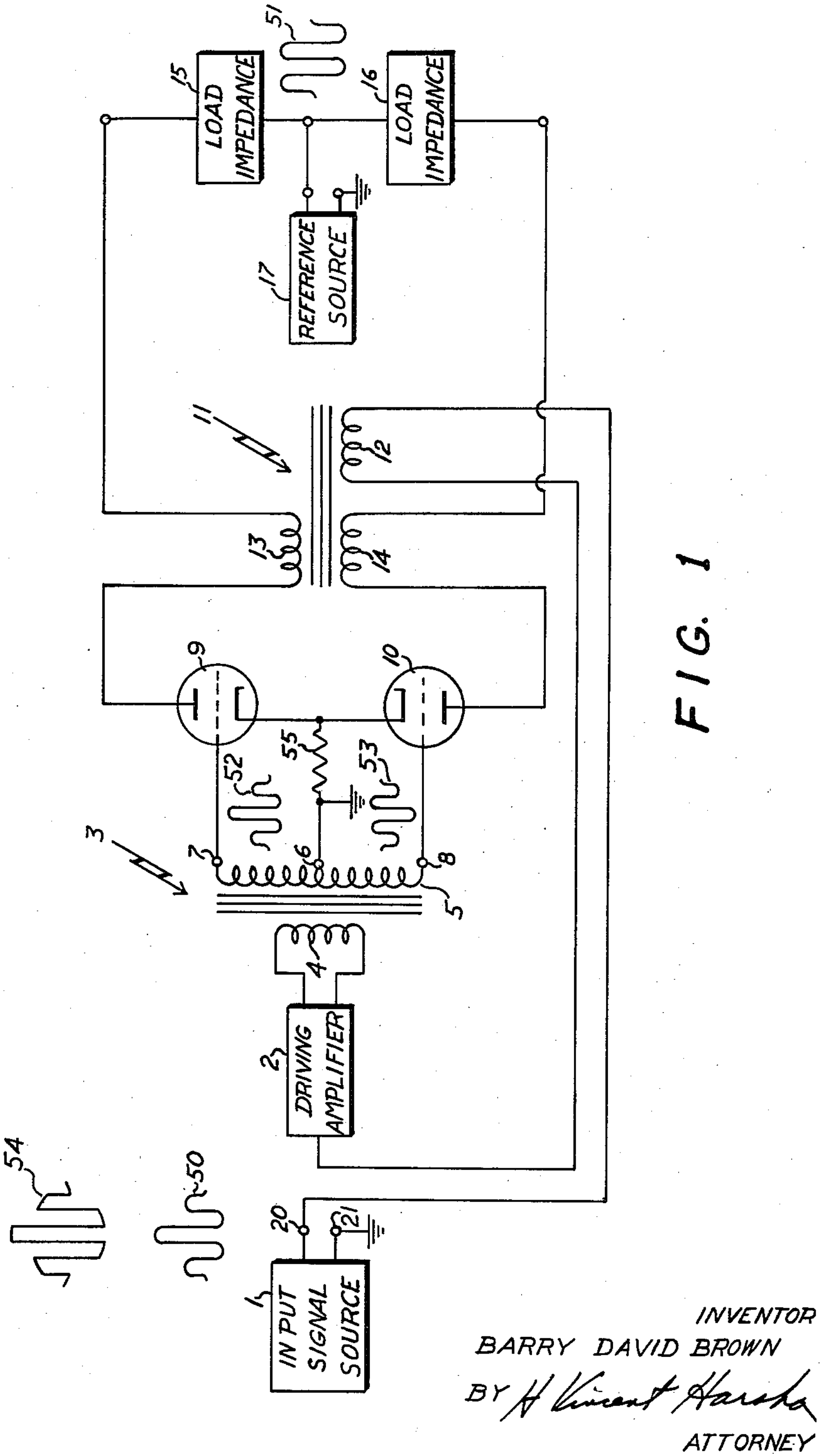

This invention relates generally to balanced demodulators for converting modulated electrical input signals to output signals having electrical amplitude variations proportional to the modulation characteristics of said input signals and, more particularly, to a means for improving the operation of said demodulators by feeding back a portion of the output signal of the demodulator system to the input of the demodulator system in order to improve the balanced characteristics of the system.

Conventional demodulators, such as those used in servo mechanism or automatic control systems, provide balanced operation by utilizing precisely matched components to give the desired accuracy and balance. However, in most conventional balanced demodulators, it is difficult and time consuming to find components that are initially well matched. Moreover, even if initially matched components have been used, aging of these components eventually produces a mismatch in the course of time. If the components are not precisely matched, unequal gains result for different phase senses of the input signal and balanced operatoin is impaired. In vacuum tube demodulators, such mismatch may be brought about because of unequal mutual conductances of the vacuum tubes being utilized in the circuit. In addition, further unbalances may occur due to D.-C. plate current drifts which result in a "zero-offset" in current through the discriminator load. Mismatches may be especially apt to occur if transistors are used in the demodulator circuit because transistor components are suspectible to changes in their characteristics due to temperature variations and, hence, demodulators with transistors may not be capable of reliable balanced operation over wide ranges of temperature.

The demodulator circuit of the invention provides a means for automatically compensating for gain or drift unbalances in the circuit due to mismatching of circuit elements. Circuits, such as demodulators, which are used to provide a conversion from substantially alternating to substantially direct signals, as in the conversion from modulated to demodulated signals, are conventionally operated in an open loop manner without feedback control.

This invention, however, utilizes a unique circuit wherein a means is provided for feeding back alternating components of the substantially D.-C. output signal. These alternating components, which are proportional to the average direct current through the load, are fed back to the input of the demodulator circuit. Such a feedback system, thus, provides a signal for correcting unbalances occurring in circuits which utilize elements which may not be precisely matched initially and also automatically corrects for unbalances which may occur due to the effects of aging over a period of time.

Figure 2:
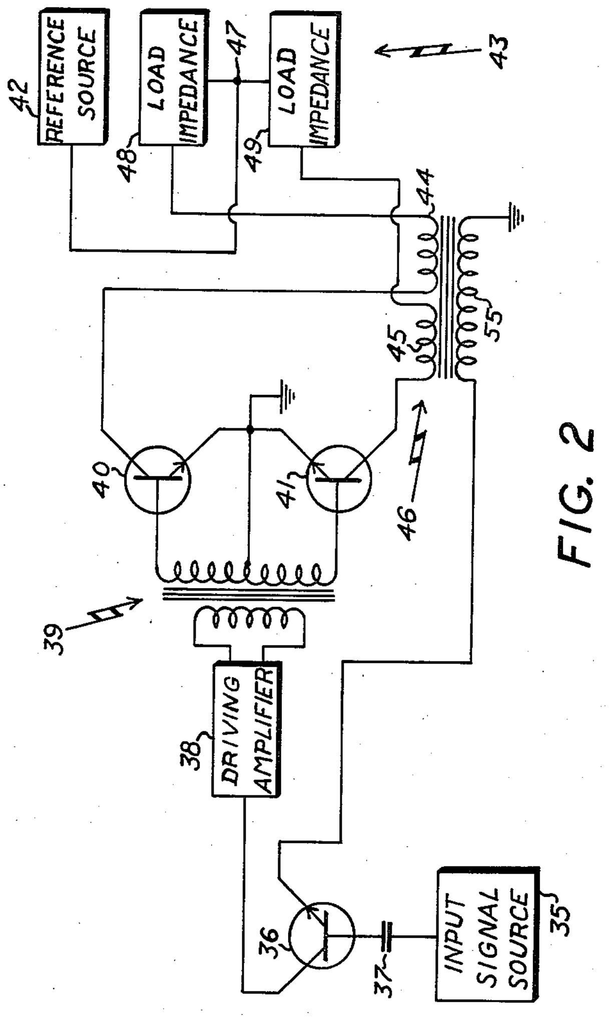

The circuit of the invention may be more easily understood with the help of the drawing in which:

FIG. 1 shows a particular embodiment of the invention as used in a vacuum tube demodulator circuit utilizing triodes; and FIG. 2 shows another embodiment of the invention using transistor elements.

In FIG. 1, there is shown a particular application of the invention as used in a servomechanism system wherein a modulated input command signal is used to drive a three-terminal load, which may be, for example, the windings of a torque motor. In the figure, terminals 20 and 21 are connected to a source 1 of input signals. Terminal 21 is connected to ground and terminal 20 is connected to the high side of input source 1. Terminal 20 is connected to the input of a driving amplifier 2 through a series-connected transformer winding 12 of a transformer 11. The output of driving amplifier 2 is connected across a primary side 4 of a transformer 3. Transformer 3 has a center-tapped secondary winding 5, which has its central tap 6 connected to ground.

A terminal 7 of secondary winding 5 is connected to the grid of a vacuum tube 9 and a terminal 8 of secondary winding 5 is connected to a grid of a vacuum tube 10. The cathodes of vacuum tubes 9 and 10 are each connected to ground through common cathode resistor 55.

The anode of tube 9 is connected to one side of a load impedance 15 through a winding 13 of transformer 11. The anode of tube 10 is connected to one side of a load impedance 16 through a winding 14 of transformer 11. As mentioned above, load impedances 15 and 16 may be, for example, the windings of a torque motor. It is understood, however, that the circuit may be used to drive other loads, such as the control winding of a saturable reactor, or similar three-terminal balanced loads. The other sides of load impedances 15 and 16 are connected together to one terminal of a reference source 17 of alternating signals. The other terminal of source 17 is connected to ground. As is clear in conventional synchronous balanced demodulator circuits, A.-C. source 17 provides a reference signal having a frequency equal to the frequency of the input carrier signal.

The operation of the circuit shown in FIG. 1 can be described as follows. Input signal source 1 provides a modulated signal comprising a carrier signal the amplitude of which varies in accordance with an input command signal. Moreover, the input signal is either in phase with or 180° out of phase with the reference signal. This type of signal is sometimes conventionally referred to as a suppressed carrier system. The modulated input signal 50 is shown in the figure at the output of input signal source 1. In the particular example shown in that figure, modulated signal 50 is in phase with reference signal 51 shown at the junction point of load impedances 15 and 16 with the output terminal of reference source 17. The modulated input signal is fed to driving amplifier 2 and, thence, to transformer 3 which provides a balanced output at its secondary due to its center-tapped secondary winding. Thus, transformer 3 provides a pair of oppositely phased modulated signals 52 and 53 which are proportional to the modulated input signal. Signal 52 is in phase with the reference source signal and exists between terminals 6 and 7 at one end of secondary winding 5. Signal 53 is 180° out of phase with the reference signal and exists between terminals 6 and 8 at the other end of secondary winding 5. Signals 52 and 53 are fed to the grids of tubes 9 and 10, respectively.

The anodes of tubes 9 and 10 are connected to a reference source through load impedances 15 and 16 and windings 13 and 14 of transformer 11, respectively. The frequency of the reference source signal is equal to the frequency of the carrier portion of the modulated input signal. If there is no input signal and if tubes 9 and 10 are exactly balanced, class A operation occurs and equal and opposite quiescent currents flow through load impedances 15 and 16. Thus, the differential current in the load (representing the algebraic difference in the currents through each of the load impedances) is equal to zero. When an input signal is applied in phase with the reference signal, as shown by wave form 50 in FIG. 1, tubes 9 and 10 provide unbalanced currents through load impedances 15 and 16. For example, in FIG. 1, for the wave forms shown therein, a greater average current flows through load impedance 15 than flows in load impedance 16 and and a differential current exists in the load. If the load is a torque motor, for instance, the motor will, thus, be driven in one direction at a rate depending upon the average value of the differential current flowing in its windings. The average value of the differential current is proportional to the variations in the amplitude modulation characteristics of the input signal.

If the input is 180° out of phase with the reference signal, the currents through the load impedances will be unbalanced in the opposite direction. In this case, the differential current will drive the torque motor in the opposite direction at a rate depending upon the average differential current. The average value of the differential current, as explained before, depends on the modulation characteristics of the input signal.

Thus, for ideal operation, it can be seen that the direction of the differential current in the load depends on the phase relation of the input signal with respect to the reference signal and the magnitude of that differential current depends on the amplitude modulation characteristics of the input signal.

In order for the ideal operation described above to occur, tubes 9 and 10 must be balanced. However, it is sometimes difficult to find tubes which are precisely matched to provide balanced operation. Moreover, tubes which are initially matched may become mismatched over a period of time as their characteristics change due to age.

In order to counteract such deterioration and performance and to correct the unbalances of the system, windings 13 and 14 of transformer 11 are inserted in series with the anode leads of tubes 9 and 10, respectively. Unbalances due to mismatching of components give rise to unbalances in currents through the load. Such unbalanced load currents are comprised of a direct component and a plurality of alternating components. The D.-C. components and the A.-C. components are mathematically related. This mathematical relationship may be expressed by a conventional Fourier series expansion. This relationship is such that the algebraic sum of the alternating components is proportional to the direct component. This invention makes use of the alternating components to provide a feedback correction signal from the output of the demodulator to the input of driving amplifier 2. The feedback signal is supplied at winding 12 by transformer action wherein there is induced in winding 12 a voltage proportional to the unbalanced alternating current flowing through windings 13 and 14. As conventional in negative feedback systems, the signal fed back to the input of driving amplifier 2 is fed back in such a sense that it counteracts the unbalance that exists in the system. Moreover, if further unbalances occur in the system due to further mismatch in demodulator components because of aging, an automatic correction feedback signal is supplied as described above to assure continuous balancing of the demodulator without the necessity of periodic external trimming.

Thus, the invention provides a means for correcting for unbalances that exist in units used for converting from modulated to demodulated signals by utilizing the unbalanced alternating components of the demodulated output as a feedback signal to the modulated input.

The feedback loop also provides a linearizing effect for the over-all operation of the demodulator system as in conventional negative feedback systems. To provide reasonably effective feedback action, it is not absolutely necessary that the wave shape of the reference signal be exactly the same as the wave shape of the carrier portion of the input signal. For example, the reference source may be a sine wave and the input signal may be a modulated square wave as shown alternatively by wave form 54 at the output of input source 1 of FIG. 1.

Another embodiment of the invention utilizing transistor components is shown in FIG. 2. In that figure, there is shown an input signal source 35, which supplies a modulated input signal to the base electrode of a transistor 36 through condenser 37. Transistor 36 acts as an input amplifier stage the output of which is connected to a driving amplifier 38, which supplies a balanced, oppositely-phased signal at the center-tapped secondary winding of transformer 39. The oppositely-phased signals from the secondary winding of transformer 39 are supplied to the base electrodes of a pair of transistors 40 and 41. The transistors are supplied with a reference signal at their collector electrodes from a reference source 42 through the center terminal 47 of a three-terminal load 43 comprising load impedances 48 and 49. The emitter electrodes of transistors 40 and 41 are connected to ground. In order to provide a correction signal, a pair of series-connected windings 44 and 45 of a transformer 46 are connected between the collector electrodes of transistors 40 and 41 and load impedances 48 and 49, respectively. A secondary winding 55 is connected to the emitter electrode of input transistor 36 to provide a feedback correction signal proportional to the alternating signals which occur on windings 44 and 45 due to an unbalance in the characteristics of transistors 40 and 41 in a manner similar to that explained with reference to FIG. 1.

Thus, the invention utilizes a feedback system not heretofore utilized by conversion devices, such as demodulators. The invention is adaptable to demodulator circuits utilizing vacuum tubes, rectifiers, or transistors. Hence, the invention is not to be construed to be limited to the specific embodiments shown in the figures and described herein except as defined by the appended claims.

What is claimed is:

1. A demodulator system comprising, in combination, a modulated input signal source, means connected to said input source for producing a pair of balanced modulated signals, said balanced signals being oppositely-phased and proportional to said input signal, a reference signal source, a demodulator including a pair of signal amplifying devices connected to said balanced signal producing means and to said reference source and responsive to said balanced modulated signals for providing an output signal the amplitude of which is substantially proportional to the modulation characteristics of said input signal, control means connected to the output of said demodulator for feeding back the alternating components of said output signal to said input source.

2. A demodulator system comprising, in combination, a source of an input signal including an alternating carrier signal having a selected frequency modulated by an input command signal, amplifying means connected to said input source, means connected to said amplifying means for producing a pair of balanced oppositely-phased modulated signals each proportional to said input signal, a source of a reference signal having a frequency substantially equal to that of said carrier signal, demodulator means including a pair of oppositely connected signal amplifying devices connected to said reference source and to said balanced signal producing means for providing an output signal the amplitude of which is substantially proportional to the modulation characteristics of said input signal, control means connected to the output of said demodulator for feeding back the alternating components of said output signal to the input of said amplifying means.

3. A demodulator system comprising, in combination, a source of an input signal including an alternating carrier signal having a selected frequency modulated by an input command signal, amplifying means connected to said input source, means connected to said amplifying means for producing a pair of balanced oppositely-phased modulated signals each proportional to said input signal, a source of a reference signal having a frequency substantially equal to that of said carrier signal, demodulator means including a pair of signal amplifying devices connected to said reference source and to said balanced signal producing means for providing an output signal the amplitude of which is substantially proportional to the modulation characteristics of said input signal, said output signal containing a substantially direct component and a plurality of alternating components, and control means connected to the output of said demodulator for feeding back said alternating components of said output signal to the input of said amplifying means.

4. A demodulator system comprising, in combination, a source of an input signal including an alternating carrier signal having a selected frequency modulated by an input command signal, transistor amplifying means connected to said input source, means connected to said amplifying means for producing a pair of balanced oppositely-phased modulated signals each proportional to said input signal, a source of a reference signal having a frequency equal to that of said carrier signal, demodulator means including a pair of transistors connected to said reference source and to said balanced signal producing means for providing an output signal the amplitude of which is substantially proportional to the modulation characteristics of said input signal, said output signal including a substantially direct component and a plurality of alternating components, and control means connected to the output of said demodulator for feeding back said alternating components of said output signal to the input of said amplifying means.

5. A demodulator system comprising, in combination, a modulated input signal source, amplifier means being connected to said input signal source and including a first transformer having a center tapped secondary winding for providing a pair of balanced and oppositely-phased modulated signals proportional to said modulated input signal, a reference signal source, demodulator means being connected to said transformer secondary winding and to said reference source and including a pair of oppositely connected electron discharge tubes for providing an output signal the amplitude of which is substantially proportional to the amplitude variations of said modulated input signal, load means connected to said demodulator means and responsive to said output signal, a second transformer having a pair of windings connected to said pair of electron discharge tubes and having a negative feedback winding connected to said input amplifier means for providing a signal having alternating components proportional to the average value of said output signal for correcting unbalances in said demodulator means.

References Cited in the file of this patent

UNITED STATES PATENTS

| | | |
|---|---|---|
| 2,073,477 | Green | Mar. 9, 1937 |
| 2,508,640 | Kuhlemeier | May 23, 1950 |
| 2,654,032 | Staschover et al. | Sept. 29, 1953 |
| 2,754,418 | Bennett et al. | July 10, 1956 |
| 2,872,595 | Pinckaers | Feb. 3, 1959 |
| 2,913,716 | Powell | Nov. 17, 1959 |